T. Hall,
Pitman Coupling.
No. 63,039. Patented Mar. 19, 1867.
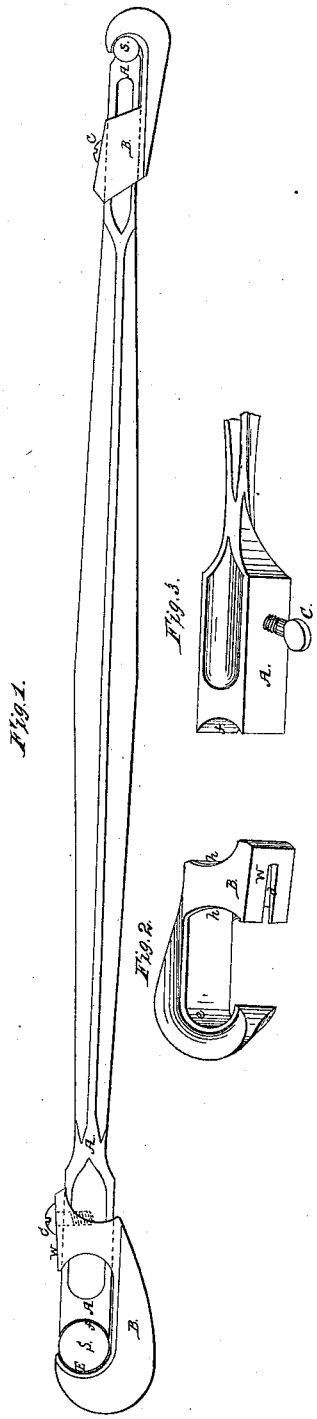

United States Patent Office.

THOMAS HALL, OF BERGEN, NEW JERSEY.

Letters Patent No. 63,039, dated March 19, 1867.

IMPROVEMENT IN CONNECTING-RODS FOR MACHINERY.

*The Schedule referred to in these Letters Patent and making part of the same.*

TO ALL WHOM IT MAY CONCERN:

Be it known that I, THOMAS HALL, of Bergen, Hudson county, State of New Jersey, have invented a new and useful Improvement in Connecting-Rods for Machinery; and I do hereby declare that the following is a full, clear, and exact description of the construction and operation of the same, reference being had to the annexed drawings, making a part of this specification.

This invention is designed to obviate the objections to connecting-rods used in running sewing machines, and for similar purposes, so that the wear of the parts at the bearings can be taken up or adjusted, and the ends of the rod be kept properly fitted with little attention or skill.

Figure 1, in drawing, is a view of the connecting-rod complete, as when in use.

Figure 2 is a view of the end piece; and

Figure 3 is the end of the rod which fits into piece B, fig. 2.

The same letters refer to like parts in each figure.

The rod A is shaped at ends so as to form one side of the bearing, as shown at $f$. The opposite side of bearing is formed in piece B at $e$. The parts are adjusted by the piece A sliding into piece B through opening $h\ h$, shown in fig. 2, to enclose bearing S, as in fig. 1. The parts are secured in place by screw C, passing through slot $d$, in piece B, into piece A, the head of screw C resting on the wedge-shaped surface W, holding piece B firmly when set, and effectually preventing it from slipping by reason of the inclined surface W.

I claim as my invention, and desire to secure by Letters Patent—

The combination of the rod A, the sliding piece B, with wedge-shaped bearing, and screw C, when the same are arranged and operate substantially as described.

THOS. HALL.

Witnesses:
    J. B. McCUNE, Jr.,
    THOS. A. MACAULAY.